Patented Dec. 22, 1942

2,306,271

UNITED STATES PATENT OFFICE 2,306,271

LUMINESCENT MATERIAL

Humboldt W. Leverenz, South Orange, N. J., assignor to Radio Corporation of America, a corporation of Delaware No Drawing. Application September 25, 1940, Serial No. 358,300

5 Claims. (Cl. 250—81)

This invention relates to luminescent materials and to the process of making such material. In particular, the invention is related to producing luminescent material having certain improved properties and characteristics which make it particularly suitable for producing an off-shade white light under cathode ray bombardment.

My new luminescent material has the property of being relatively easy to prepare and yet, has the very desirable properties of resistance to burning under cathode ray bombardment, substantially uniform response with time to excitation, efficient conversion of electronic energy to light energy under low voltage cathode ray excitation and substantially uniform spectral emission throughout the life of the material.

Moreover, my new material lends itself to reproducible characteristics so that different batches of material have substantially identical physical properties.

In addition to these desirable properties, my new material has a relatively long phosphorescent period, on the order of 2 to 3 times longer than that of green willemite, which makes it particularly advantageous for use in certain types of cathode ray tubes.

In addition to its many desirable properties, making it particularly useful in cathode ray tubes, my new material may be used advantageously in fluorescent lamps used for general and special lighting purposes since by suitable proportioning of ingredients a cream color light is produced which lends for phosphorescence and warmth such as is desirable in certain types of decor. The relatively long decay period which is obtainable is an especially desirable property for lighting.

A further advantage arising from my invention is that the method of manufacture results in that the spectral emission may be established beforehand and controlled by the process of manufacture. My new luminescent material may have the color of the emitted light controlled over a wide spectral range by changing the proportions of the component materials entering into the composition of the luminescent material. By such changes in proportions, the spectral range may be varied from orange yellow to infra-red as saturated colors, and from cream color to tans and browns as unsaturated colors. Moreover, the phosphorescent period may be of approximately exponential decay form and made relatively long. Variations in color and variations in the duration of the decay period may also be effected by the variation of compositions and the method of synthesis. Moreover, the spectral emission may be controlled by the final heating temperature and duration of heating during the manufacture or by varying both the proportions of the constituent materials and the regulation of the processing temperature. Further control may be had by regulating the rate of heating and cooling in the final firing of the material.

Accordingly, it is one of the purposes of my invention to provide a luminescent material in which the spectral emission may be changed from one end of the spectrum to the other throughout the intermediate ranges thereof by changing the proportions of the materials entering into the synthesis of the finally prepared luminescent material, together with the ability to fix the degree of saturation of the resultant color.

Moreover, it is one of the purposes of my invention to provide a luminescent material whose spectral emission characteristic may be changed from one end of the spectrum to the other through all of the intermediate wave lengths thereof by controlling the temperature and duration of the heating of the luminescent product during its processing.

A further object of my invention is to shift the emission spectrum from the green end toward longer wave lengths up to and including the red end by isomorphic mutual replacements and the crystal lattice of the luminescent material.

A still further object of my invention is to prepare a material which will emit light of high intensity under cathode ray bombardment.

Another object of my invention is to provide a process for synthesizing a luminescent material with invariant spectral distribution with regard to length of time of cathode ray bombardment.

Another object of my invention is to prepare a material which will produce the effect of emitting off-shade white light under high intensity cathode ray bombardment. This is accomplished by providing a luminescent material whose emission spectrum characteristic is such that when taken in conjunction with the spectral response characteristic of the human eye, the over-all characteristic is one which provides sufficient energy in the visible spectrum to give the visible sensation of cream white.

A still further object of my invention is to provide a process whereby improved luminescent materials may be prepared with minimum expense but, nevertheless, possess the advantage of uniformly superior response characteristics.

Other objects and advantages of my invention will be immediately apparent to those skilled in the art upon reading the following description of my invention.

The luminescent material with which my invention is concerned is a crystalline structure comprising magnesium cadmium silicate activated by manganese. In this respect the crystalline structure may be in the form of magnesium ortho-silicate cadmium meta-silicate, where molecular ratios are used, or by suitable control, the magnesium silicate may be partically meta-silicate and partially ortho-silicate or totally meta-silicate, depending upon whether or not an excess or deficiency of silicon dioxide is used in the preparation of the material. It should be understood that the material is not a mixture of magnesium and cadminum silicate in the usual sense, but is actually a homogeneous crystal comprising manganese activated magnesium cadmium silicate in a single crystal lattice structure, so that the magnesium and cadmium silicates are held in a single lattice structure, together with manganese and silicon dioxide. In this material, the ratio between the magnesium silicate and the cadmium silicate may be varied from 10,000 to 1 to 1 to 10,000. Thus, a formula which is descriptive of my luminescent material possessing the above outlined characteristics may be expressed as follows:

$$x(MgSiO_4) y(CdSiO_3) : Mn$$

In this formula, the variables $x$ and $y$ may be such that $x/y$ may be varied from 10,000/1 to 1/10,000. This formula is descriptive of where the amount of silicon dioxide is such to give the exact magnesium ortho-silicate cadmium meta-silicate proportions. However, where these proportions are not followed and an excess or insufficient amount of silicon dioxide is used, then the following formula is descriptive of the luminescent material:

$$u(MgO) v(CdO) w(SiO_2) : Mn$$

Here the ratio between $u$, $v$ and $w$ may be varied over extremely wide limits such as, for example, as indicated above.

The composition may also be written as $$u(MgO) v(CdO) w(SiO_2) : MnO_x$$

indicating that the manganese activator may be in the form of an oxide, and to further indicate that the formula does not mean a chemical composition in the usual sense which chemical formulas indicate. It will be appreciated, of course, that the colon indicates that the substances following the colon are present in very small quantities and constitute the activator. Such terminology has already been used in the art and serves to indicate that the activator is held in such close physical bondage that breaking down the substance even into microscopic particles still gives the substance substantially the same properties as it has with macroscopic aggregates so that for all intents and purposes it might be called a quasi-chemical compound.

The amount of silicon dioxide may be varied from amounts less than needed for molecular proportions to 100% or greater than the molecular proportions. In practice it has been determined that the amount of silicon dioxide may be varied from a lower limit of approximately 20% to an upper limit of approximately 500% of the amount which would be necessary, calculated on the basis of molecular proportions. The amount of manganese may likewise be varied within wide limits—for example, between values of 0.1 molal to 0.00001 molal with respect to the total cation molality.

While the amount of manganese may be varied between these wide limits so as to control, in part, the spectral response, it is found that when the amount of manganese is approximately 0.006 molal, the maximum efficiency in conversion of energy to light by the luminescent material is obtained. If this proportion of manganese does not give the required spectral response, the spectral response may be shifted by other means, such as the heat treatment, or changing the proportions of magnesium, cadmium or silicon dioxides.

Germanium may be substituted for silicon, in part or in whole, as explained in my Patent No. 2,210,087, entitled "Process for synthesizing luminescent material," which issued August 6, 1940.

The steps in the process of mixing, precipitating, heating and finally comminuting the luminescent material, follow the steps described in my above identified Patent No. 2,210,087, which patent, however, referred to the preparation of manganese activated zinc ortho-silicate. The essential difference between the preparation of my magnesium cadminum silicate activated by manganese is that magnesium and cadmium nitrates are added to very finely divided silicon dioxide in suspension, in contradistinction to the use of zinc nitrate, as described in the patent.

The mixture is heated and stirred and when brought to a boil, there is added very slowly and carefully with plenty of agitation saturated ammonium carbonate solution of great purity and in sufficient quantity to precipitate the metallic salts, as carbonates, on the finely divided silicon dioxide. The contents of the beaker are then evaporated with stirring to dryness and then heated by an appropriate manner to red heat. The contents are then allowed to cool and are ground and mixed with a quartz rod. The resultant product is then placed in a quartz crucible and a suitable quantity of manganese nitrate solution of the greatest purity obtainable is added, the exact quantity ranging between 0.1 and 0.00001 molal with respect to the total cation molality depending on the actual spectral emission distribution desired.

Quartz-distilled water is then added to the amount to make the mixture thoroughly wet. The crucible is then heated and the contents thereof stirred until brought to a boil, whereupon concentrated ammonium carbonate is added to precipitate the manganese, in the form of manganese carbonate upon the previously precipitated carbonates and oxides.

As an alternative step, the manganese may be present and co-precipitated with the magnesium and cadmium right at the beginning, which may be desirable in commercial production, where the optimum concentration of the activator is known. By so doing, the extra step in the process is eliminated and thus, reduces the cost of production. The separate or extra activation step first described, however, is of convenience where it is desirable to vary the concentration of the activator, when it is desired to produce from the same batch of materials a number of materials whose properties shall have small, but predetermined differences in their characteristics.

The contents of the crucible are then evaporated with stirring to dryness and upon cooling, the contents are ground with a quartz rod. The contents are then transferred to a covered crucible and heated to between 700° and 1600° C. in an electric furnace, for example. It has been found by experience that the optimum temperature lies between 1100°–1500° C. and the heating time is preferably on the order of an hour. The final product is a lightly fritted powder or a fused mass, which gives intense cathodo-luminescence. It will be appreciated that the resultant color of the luminescent product will depend upon the actual ratios between the magnesium and cadmium. As was pointed out above, the spectral emission characteristic can also be controlled by changing the amount of manganese or by controlling the temperature to which the product is heated or by controlling the length of time that the material is heated.

I may further modify and control the emission spectrum characteristic by means of high temperature quenching, as described in my Patent No. 2,129,096, entitled "Luminescent material and method of preparing same," which issued September 6, 1938. By means of high temperature quenching, the lattice structure of my improved crystalline material may be expanded with a consequent shift in the emission spectrum toward the longer wave lengths. As a result of this, additional advantages accrue to my materials and methods, since it is possible to utilize a single prepared batch of material for purposes requiring different spectral emission characteristics by the additional step of high-temperature quenching.

In this process, it will be noted that no halides and, in particular, no fluorides are used in the process of preparing the composition. Consequently, the necessity for providing platinum ware for use in preparation of my improved luminescent material is unnecessary. Therefore, it is readily seen that the cost of preparing such materials is materially reduced. It will be apparent from the foregoing that this composition of material described by the present invention, in addition to the property of having controlled spectral range, possesses the other desirable features of manganese activated zinc ortho-silicate, which have been enumerated in my Patent No. 2,210,087, referred to above, among which are highly efficient emitting light of high intensity under cathode ray bombardment possesing an invariant spectral distribution with regard to the length of time of cathode ray bombardment, which has cheapness of preparation, controllable spectral emission, and precise spectral emission characteristics controlled by temperature and heating process.

My new luminescent material has, by suitable selection of the ratio of magnesium to cadmium, the property of emitting cream white light under cathode ray bombardment, and consequently, may be used with improved results in kinescopes, used for reproduction of television images. The increased phosphorescent time, which is an attribute of my new material, is of an advantage where the number of fields per second is relatively low when used in television types of tubes. The prolonged phosphorescence, of course, is of considerable advantage when the material is used in fluorescent tubes for lighting purposes. Moreover, the cream white color of the fluorescent lamps lends itself particularly useful where it is desired to provide a warm feeling to reception halls, make-up rooms and the like.

It will be further appreciated that television images in cream white color are preferable to the usual blue-green images, such as provided by the ordinary willemite screens, and the high efficiency of this material under low voltage cathode ray bombardment means that far more intense images can be obtained, so that the material is, for this reason, further useful in cathode ray tubes for television purposes. The cream white color of the material under excitation may be varied so as to change the color from cream white through an orange red, if, for any reason, it is desirable to do so, by merely changing the ratio between the magnesium and cadmium, or by varying the amount of manganese activator, or by varying the heat treatment above described.

If it is desired to increase the secondary emission of this material, the manganese activated zinc magnesium cadmium silicate, which I have described, may be mixed with small amounts of barium, strontium, calcium, casium, rubidium, lanthanum, cerium, thorium, any of their compounds, or other elements or their compounds, which have large ionic or atomic radii. In certain applications of luminescent material, it is desirable to have high secondary emission and by mixing small amounts of the above identified materials, this desirable feature can be readily obtained.

Having described my invention, what I claim is:

1. A luminescent material consisting of a manganese activated combination of oxides of magnesium and cadmium and said combination constituting a single lattice structure, an oxide of an element selected from the group of elements consisting of silicon and germanium.

2. A luminescent material consisting of manganese activated magnesium cadmium silicate.

3. A luminescent material consisting of manganese activated magnesium cadmium germanate.

4. A luminescent material consisting of a manganese activated combination of oxides of magnesium and cadmium and an oxide of an element selected from the group of elements consisting of silicon and germanium and a compound of an element having a large atomic radius, said radius being at least equal to the atomic radius of thorium, the work function of said element being no greater than the work function of thorium, said combination constituting a single lattice structure.

5. A luminescent material consisting of a manganese activated magnesium cadmium compound of an element selected from the group of elements consisting of silicon and germanium.

HUMBOLDT W. LEVERENZ.

CERTIFICATE OF CORRECTION.

Patent No. 2,306,271. December 22, 1942.

HUMBOLDT W. LEVERENZ.

It is hereby certified that error appears in the printed specification of the above numbered patent requiring correction as follows: Page 3, second column, line 40-41, claim 1, strike out "said combination constituting a single lattice structure,"; line 43, same claim, after "germanium" and before the period insert --, said combination constituting a single lattice structure--; and that the said Letters Patent should be read with this correction therein that the same may conform to the record of the case in the Patent Office.

Signed and sealed this 7th day of September, A. D. 1943.

(Seal)

Henry Van Arsdale,
Acting Commissioner of Patents.